United States Patent
Soltanian et al.

(10) Patent No.: US 7,272,126 B2
(45) Date of Patent: Sep. 18, 2007

(54) METHOD AND APPARATUS FOR BEACON DISCOVERY IN A SPREAD SPECTRUM CELLULAR RADIO COMMUNICATION SYSTEM

(75) Inventors: Amir Soltanian, Potomac, MD (US); Mirjana Peric, Bethesda, MD (US)

(73) Assignee: PCTEL, Inc., Chicago, IL (US)

( * ) Notice: Subject to any disclaimer, the term of this patent is extended or adjusted under 35 U.S.C. 154(b) by 384 days.

(21) Appl. No.: 11/101,340

(22) Filed: Apr. 7, 2005

(65) Prior Publication Data

US 2006/0227750 A1    Oct. 12, 2006

(51) Int. Cl.
H04B 7/216 (2006.01)

(52) U.S. Cl. .................. 370/335; 370/229; 370/252; 370/320; 370/328; 370/338; 370/342; 370/350; 370/441; 370/468; 370/479; 375/130; 375/362; 342/357.12

(58) Field of Classification Search ............ 370/335, 370/229, 252, 310, 320, 328, 338, 342, 350, 370/441, 468, 479; 375/130, 362, 141, 142; 342/357.12
See application file for complete search history.

(56) References Cited

U.S. PATENT DOCUMENTS

| | | | | |
|---|---|---|---|---|
| 6,741,856 B2 * | 5/2004 | McKenna et al. | ....... | 455/422.1 |
| 6,757,323 B1 * | 6/2004 | Fleming et al. | ............. | 375/142 |
| 7,019,691 B1 * | 3/2006 | Soltanian et al. | ........... | 342/368 |
| 7,200,391 B2 * | 4/2007 | Chung et al. | ............... | 455/423 |
| 2004/0213182 A1 | 10/2004 | Huh et al. | | |
| 2005/0053049 A1 | 3/2005 | Blanz et al. | | |
| 2005/0249114 A1 * | 11/2005 | Mangin et al. | ............. | 370/229 |

OTHER PUBLICATIONS

"Forward Link Coding and Modulation for CDMA2000 1XEV-DO (IS-856)" by Nagabhushana T. Sindhushayana and Peter J. Black, 2002.
"On the Peak-to-Average Ratio (PAR) of an IS-856 (cdma2000 1 xEV) Forward Link" by Rashid A. Attar, UEEE NWCN 2001, Aug. 2001.
"cdma2000 High Rate Packet Data Air Interface Specification" by 3rd Generation Partnership Project 2 (3GPP2), pp. 9.60-9.98, Oct. 25, 2002.
"1xEV: 1xEVolution IS-856 TIA/EIA Standard: Airlink Overview", Qualcomm. Inc., Nov. 7, 2001.

* cited by examiner

*Primary Examiner*—Matthew Anderson
*Assistant Examiner*—Shaima Q. Aminzay
(74) *Attorney, Agent, or Firm*—Welsh & Katz Ltd.

(57) ABSTRACT

An improved apparatus (and corresponding methodology) for discovering beacon signals in a spread spectrum radio communication system is provided, wherein the beacon signals comprise a plurality of different code sequences having index values assigned thereto and having portions that overlap one another. Correlation is performed over an extended search window. Ambiguities between correlation peaks are resolved by identifying correlation peak pairs corresponding to overlapping code sequences and having time offsets that fall within a predetermined tolerance window. Each pair is analyzed to identify the peak with a lower power level metric, and information pertaining to this lower power level peak is discarded from output and processing operations that follow therefrom.

18 Claims, 5 Drawing Sheets

METHOD AND APPARATUS FOR BEACON DISCOVERY IN A SPREAD SPECTRUM CELLULAR RADIO COMMUNICATION SYSTEM

BACKGROUND OF THE INVENTION

1. Field of the Invention

This invention relates broadly to radio communication systems. More particularly, this invention relates to spread spectrum cellular communication systems, such as 1xEV-DO systems, that employ a beacon signal (e.g., a pseudo-noise digital sequence in 1xEV-DO systems) as part of the forward communication link within the system.

2. State of the Art

Current spread spectrum cellular wireless technologies, such as CDMA2000 (also known as IS-2000), have features that significantly improve voice capacity and data services. However, such technologies are not fully optimized for high speed IP traffic. For example, the highest transmit rate on the forward link is 307.2 kbps using the 1X spreading version (1.25 MHz). Thus, a new cellular wireless technology, known as IS-856 or 1xEV-DO, was developed to provide efficient high rate packet data services without the constraints of supporting legacy modes of operation.

In 1xEV-DO systems, a network of Access Points (which are sometimes referred to as servers) provide high rate data access on a wireless CDMA channel to a collection of static or mobile Access Terminals (which are sometimes referred to as user terminals). The Access Points are analogous to base stations in IS-95 systems and are sometimes referred to as such, and the Access Terminals are analogous to mobile units in IS-95 systems and are sometimes referred to as such.

The information is transmitted from the Access Points to the Access Terminals over a forward link that is organized with a frame structure shown in FIG. 1. The total frame length is 26.67 ms and each frame is divided equally into sixteen 1.666 ms timeslots each carrying 2048 chips (1.2288 Mcps*1.666 ms). Each slot is further divided into two half-slots, each of which contains a pilot burst as shown in FIGS. 2A and 2B. Each pilot burst has a duration of 96 chips, and is centered at the midpoint of the half slot. Within each slot, a Pilot channel (which is realized by the pilot bursts), a Forward Medium Access Control (MAC) channel, and a Traffic/Control channels are time multiplexed. There are two different structures for the 1xEV-DO forward link time slot as illustrates in FIGS. 2A and 2B: one for an active slot where data transmission occurs (FIG. 2A) and one for the idle slot when there is no transmission of data to any user (FIG. 2B).

The time-division-multiplexed channels are transmitted at maximum power of the sector, thereby eliminating power sharing amongst active users. During data transmission, data is directed to only one Access Terminal at a time using the full power of the Access Point to allow the highest possible data rate for that one user.

The MAC channel consists of two subchannels: the Reverse Power Control (RPC) channel and the Reverse Activity (RA) channel. The Traffic/Control channels carry user data and control data between the Access Point and the Access Terminal. Details of the data carried in these channels are set forth in 3GPP2 C.0024 Version 2.0, "CDMA2000 High Rate Packet Data Air Interface Specification," herein incorporated by reference in its entirety.

1xEV-DO systems employ a burst pilot, which is optimal for bursty packet data services. The burst pilot is transmitted on a separate code channel as in IS-95 and also it is punctured into the forward link waveform at pre-determined intervals as shown in FIG. 3. The burst pilot is transmitted at the maximum power that the cell is enabled to transmit. Using the full power of the cell for the pilot provides the highest possible Signal-To-Noise Ratio (SNR) so that an accurate channel estimation can be obtained quickly, even during dynamic channel conditions.

The burst pilots are sequences of 96 chips in length that are derived from a reference pseudo-noise (PN) sequence of 32,768 chips in length. The reference PN sequence is punctured at predetermined 96 chip intervals to select corresponding 96 chip subsequences (or chunks) therein. The predetermined intervals are offset by 64 chips such that there exists 512 (32,768/64) possible burst pilot sequences. Each of these 512 burst pilot sequences is identified by an index in the range from 0 to 511. One of the 512 possible burst pilot sequences is assigned to each Access Point in the network. This burst pilot sequence allows the Access Terminals to identify the Access Point and to acquire timing for initial acquisition, phase recovery, timing recovery, and maximal-ratio combining. It also provides a means for predicting the receive signal strength for the purposes of forward data rate control (DRC).

The synchronization of the Access Points of the 1xEV-DO system is achieved by the use of Global Positioning System (GPS) receivers at each Access Point location. Aided by appropriate stable clock generators, these GPS receivers supply accurate timing information to the Access Point.

Pilot pollution occurs within the coverage area of the 1xEV-DO system when numerous pilot signals are received with relatively equal signal strength. Such pilot pollution is detrimental because it may cause dropped data transfers and decreased capacity. Thus, it is advantageous to optimize the allocation of the burst pilot sequences over the Access Points of the network in order to minimize such pilot pollution.

Such optimization is typically accomplished by drive-testing the intended coverage area of the 1xEV-DO cellular system with a pilot scanner that detects the received pilot signals and measures/records the signal strengths of the detected piloted signals at various locations within the intended coverage area of the 1xEV-DO cellular system. The pilot scanner requires access to an accurate clock source. Typically, the Global Positioning System (GPS) is used as the clock source. As such, these devices typically have GPS receivers.

In 1xEV-DO systems, there is a general assumption that all Access Points must limit their power so that burst pilot sequences will be received by the Access Terminals within a maximum delay of 64 chips due to signal path propagation. However, if the network is tuned so that the burst pilot sequences can be received at further distances (or if the Access Points lose synchronization to the system clock), it is possible to receive burst pilot sequences in a chip delay greater than 64 chips.

In current 1xEV-DO pilot scanning systems, it is possible to employ a search window with a length greater than 64 chips to detect these situations. However, the extended search window introduces an ambiguity in the detection of such burst pilot sequences. More particularly, assume that the Access Point is transmitting a burst pilot sequence whose index is 256 and there is no signal delay due to propagation. When the pilot scanner searches for this burst pilot sequence, it will find burst pilot sequence 256 at zero chip delay and will also find burst pilot sequence 255 at 64 chip delay. This occurs due to the fact that in 1xEV-DO systems, two adjacent pilot signals have a 32 chip overlap. This ambiguity is commonly resolved by L3 message detection and decoding wherein the index of the two pilot signals is recovered and the duplicative pilot signal (in the example above, the burst pilot sequence 255 at 64 chip delay) is ignored.

Disadvantageously, such L3 message detection and decoding is complex and costly to develop and implement. Moreover, the signal processing operations required for such L3 detection and decoding add to the processing time of the scanner and ultimately slows down the scan speed. Thus, there remains a need to provide an improved apparatus and methodology for evaluating signal propagation and coverage, including burst pilot measurements, in 1xEV-DO systems and the like.

SUMMARY OF THE INVENTION

It is therefore an object of the invention to provide an improved apparatus and methodology for efficient correlation-based pilot detection over an extended search window.

It is a further object of the invention to provide such an apparatus and methodology that avoids the complexity and computation burden associated with L3 message detection and decoding.

In accord with these objects, which will be discussed in detail below, an improved apparatus (and corresponding methodology) for discovering beacon signals in a spread spectrum radio communication system is provided, wherein the beacon signals comprise a plurality of different code sequences having index values assigned thereto and having portions that overlap one another. Correlation is performed over an extended search window. Ambiguities between detected correlation peaks are resolved by identifying correlation peak pairs corresponding to overlapping code sequences and having time offsets that fall within a predetermined tolerance window. Each pair is analyzed to identify the peak with a lower power level metric, and information pertaining to this lower power level peak is discarded from output and processing operations that follow therefrom.

It will be appreciated that such mechanisms are applicable to 1xEV-DO systems for use in detecting pilot signals and accurately assign the detected pilot signals in applications where the burst pilot sequences can be received by the Access Terminals at maximum delay greater than 64 chips. Such pilot scanning mechanisms are applicable to test measurement devices (that collect and store signal propagation data and coverage data) as well other radio receivers that are used for network troubleshooting in a 1x EV-DO network as well as in other spread spectrum cellular radio communication systems that employ similar beacon signals in the forward link of the system.

Additional objects and advantages of the invention will become apparent to those skilled in the art upon reference to the detailed description taken in conjunction with the provided figures.

DETAILED DESCRIPTION

Figure 4:
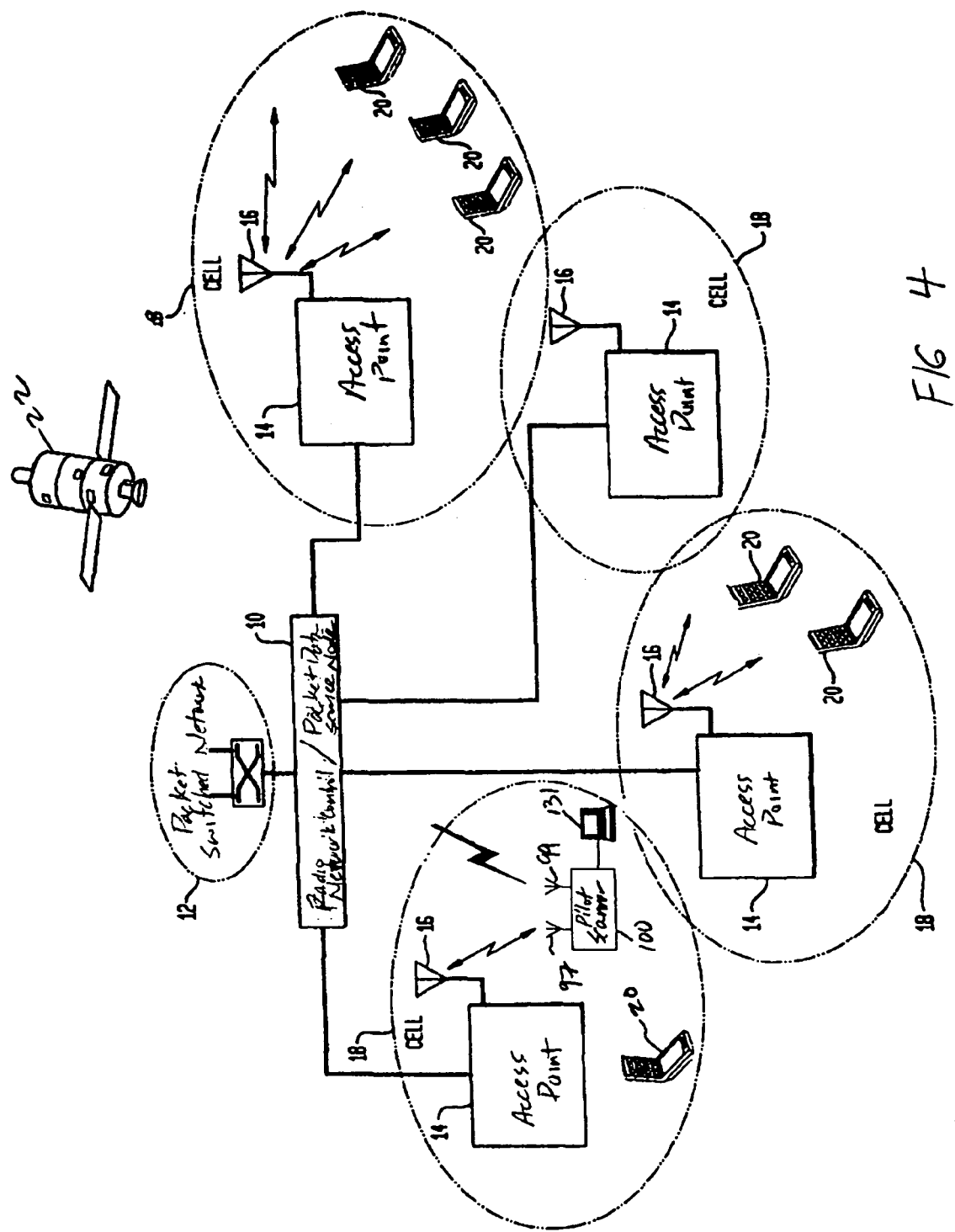
FIG. 4 is a schematic block diagram of a 1xEV-DO network in which the pilot scanner device of the present invention can be used.

Turning now to FIG. 4, there is shown a schematic diagram of a typical 1xEV-DO network. A Radio Network Control/Packet Data Service Node 10 provides for packet routing between the Access Points 14 of the network and a packet switched network 12 (e.g., the Internet or a wide area network) and is also responsible for managing the radio communication resources of the network and for handoffs between Access Points in the network. Each Access Point 14 includes a fixed position multi-channel transceiver that is coupled to a cellular antenna 16. Each Access Point 14 and antenna 16 act as a communication gateway over a local geographical area called a cell 18. The cells 18 of the network are geographically distributed in a manner that defines the coverage area of network. It is common for several cells 18 to be sectored around a common antenna tower. The tower will have several directional antennas, each covering a particular area. This co-location of several antennas is sometimes called a cell-site or a transceiver station.

Figure 1:
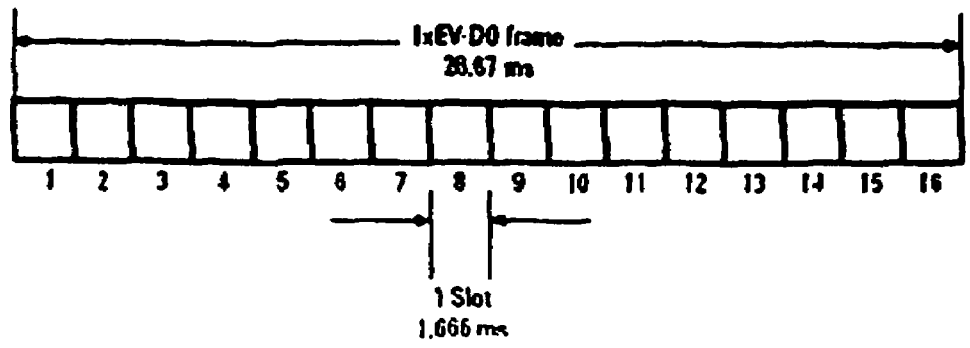
FIG. 1 is a pictorial illustration of the frame structure used in the 1xEV-DO forward link between Access Points and Access Terminals.
Figure 2A:
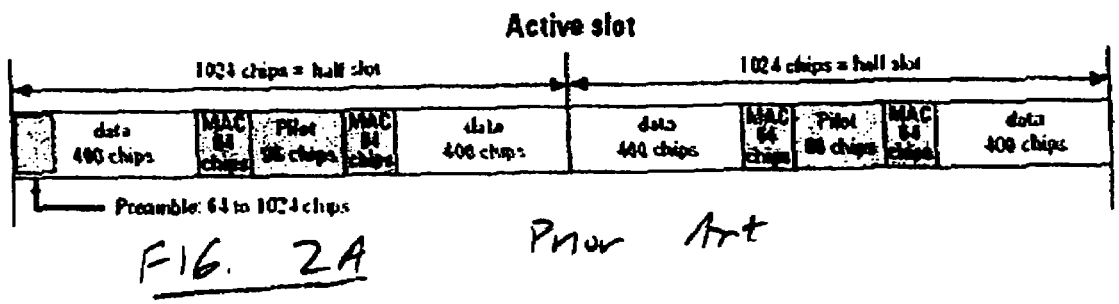
FIG. 2A is a pictorial illustration of an active time slot in the 1xEV-DO frame structure of FIG. 1.
Figure 2B:
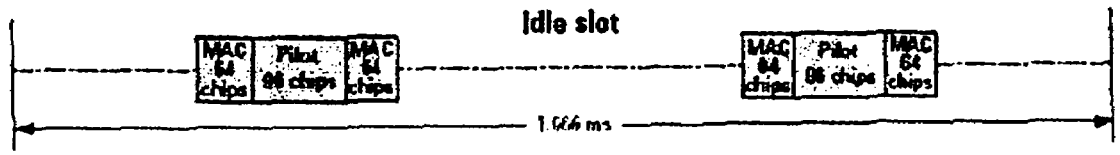
FIG. 2B is a pictorial illustration of an idle time slot in the 1xEV-DO frame structure of FIG. 1.
Figure 3:
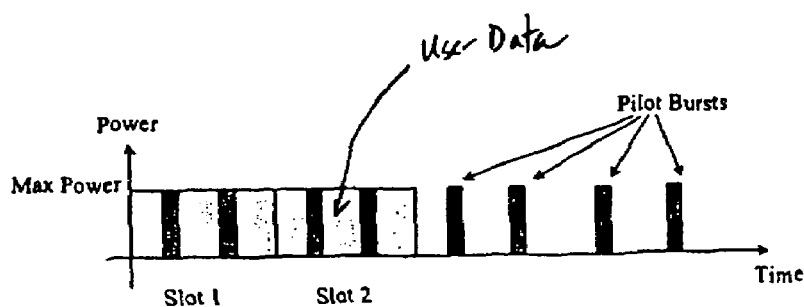
FIG. 3 is a pictorial illustration of the burst pilot signals transmitted n the 1xEV-DO frame structure of FIG. 1.

Each Access Point transmits a burst pilot sequence in the Pilot Channel as described above with reference to FIGS. 1-3. The burst pilot sequence is a PN sequence of 96 chips in length that is derived from a reference pseudo-noise (PN) sequence of 32,768 chips in length. The reference PN sequence is punctured at a predetermined 96 chip interval to select a corresponding 96 chip subsequence (or chunk) therein. The predetermined interval is selected from a plurality of intervals that are offset by 64 chips. Thus, there exists 512 (32,768/64) possible burst pilot sequences. Each one of the 512 burst pilot sequences is identified by an index in the range from 0 to 511. One of the 512 possible burst pilot sequences is assigned to each Access Point 14 in the network. This burst pilot sequence allows the Access Terminals 20 to identify the particular Access Point 14 that transmits this burst pilot sequence and to acquire timing for initial acquisition, phase recovery, timing recovery, and maximal-ratio combining. It also provides a means for predicting the receive signal strength for the purposes of forward data rate control (DRC). The Access Terminals 20 may be realized by a radio-enabled computer, a radio-enabled PDA, a dual mode cell phone/PDA (e.g., a device that includes IS-95 functionality for cell-based voice calls as well as functionality for 1xEV-DO packet data access), a radio-enabled automobile computer, or other suitable 1x EV-DO radio-enabled data processing devices.

The system time and thus the synchronization of the Access Points 14 is achieved by the use of the Global Positioning System (GPS) satellite constellation 22 and GPS receivers at each Access Point location 14. Aided by appropriate stable clock generators, these GPS receivers supply accurate timing information to the Access Point 14.

A pilot scanner device 100 in accordance with the present invention can be located in any one of the cells 18 of the network. The pilot scanner device 100 cooperates with a computer system 131 operably coupled thereto to derive and store signal quality metrics of the 1xEV-DO signals transmitted from the corresponding Access Point 14. Such metrics are typically gathered as part of a drive-test over multiple locations within the cells 18 of the network and used in post-processing network optimizations, such as frequency planning optimizations and coverage optimizations.

Figure 5:
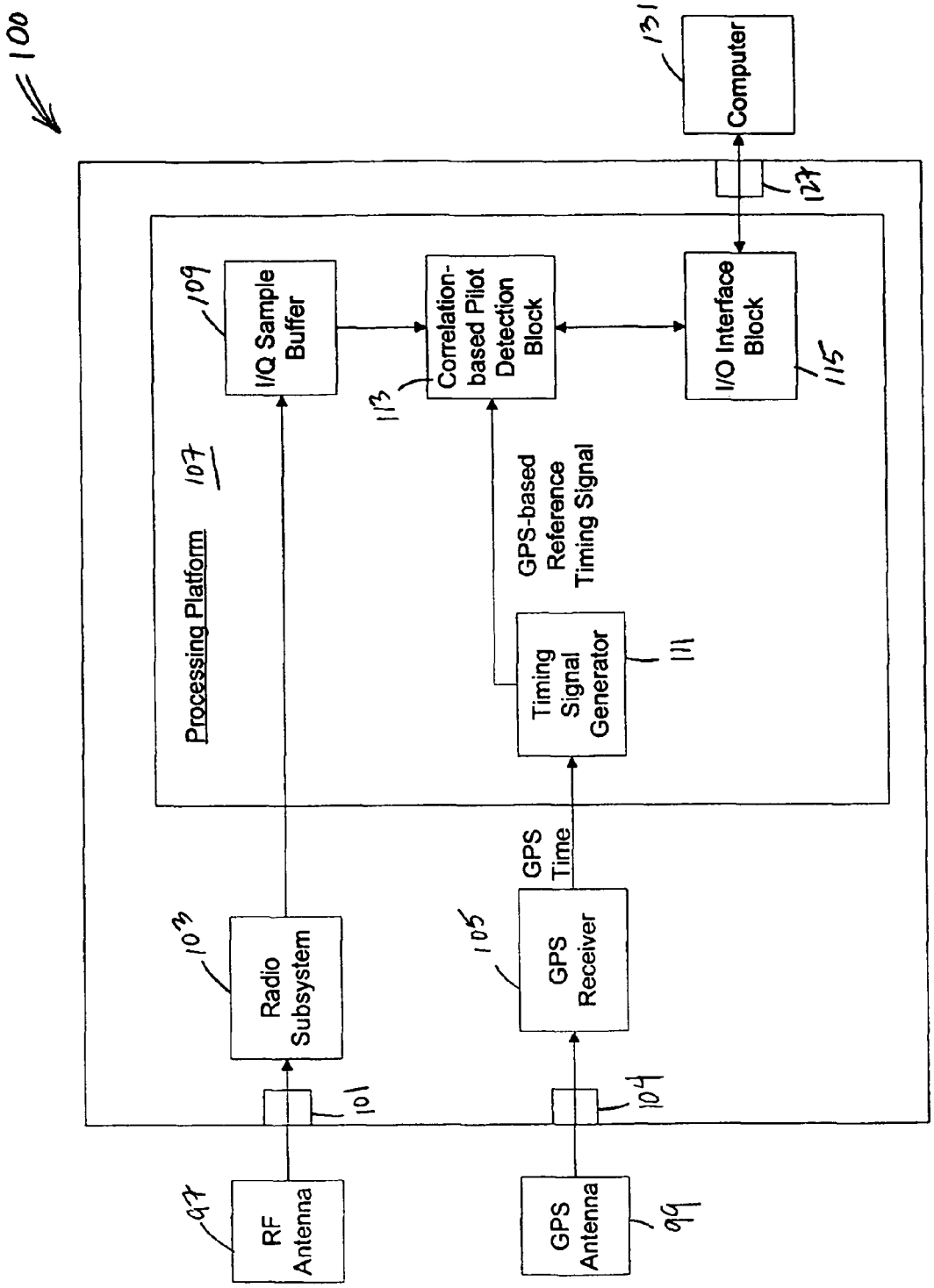
FIG. 5 is a functional block diagram of a pilot scanner device in accordance with the present invention.

Turning now to FIG. 5, there is shown a block diagram of a pilot scanner device 100 in accordance with the present invention. The pilot scanner device 100 generally includes a radio subsystem 103 (e.g., an RF tuner and quadrature demodulator) and a GPS receiver 105 that interface to a processing platform 107. The radio system 103 cooperates with an RF antenna 97, which is coupled thereto via port 101, to receive an RF frequency band that carries the burst pilot signals of the 1xEV-DO cellular system (which may be centered around 1.9 GHz, 800 MHz or other predetermined RF frequency band). The radio subsystem 103 downconverts the received RF frequency band to a baseband signal and samples the baseband signal to derive baseband quadrature (I, Q) samples in digital form that represent the received pilot signals. The processing platform 107 includes I and Q sample buffers 109 that store the baseband I and Q samples, respectively. The GPS receiver 105 cooperates with a GPS antenna 99, which is coupled thereto by port 104, to receive an RF frequency band that carries the GPS signals of the GPS system. The GPS receiver 105 downconverts and processes the received RF frequency band to recover a GPS time signal therein.

The processing platform 107 also includes a timing signal generator 111, a pilot detection block 113, and an input/output interface block 115. The processing platform 107 is preferably realized by a digital signal processor. Alternatively, it can be realized by an FPGA, an ASIC or other suitable data processing means. The timing signal generator 111 is preferably realized as a programmed timer that is part of the processing platform 107. Alternatively, it can be realized by electronic circuitry that is interfaced to the processing platform 107 or other suitable means.

The timing signal generator 111 receives the GPS time signal output by the GPS receiver 105 and uses the GPS time signal to generate a GPS-based reference timing signal. In the preferred embodiment, the GPS-based reference timing signal is synchronized to a common system-wide time scale used by all 1xEV-DO Access Networks. The period of this GPS-based reference timing signal is 2 seconds and it is synchronized with the even seconds of the common system-wide time scale. The pilot detection block 113 correlates the baseband I and Q signal samples stored in the sample buffers 109 with each one of the 512 possible burst pilot sequences over an extended search window that is larger than 96 chips (i.e., the length of each burst pilot sequence). In the preferred embodiment, the search window has a length of 256 chips and can extend up to 1024 chips. The local correlation peaks represent an indication of the presence of detected pilot signals corresponding to the locally generated burst pilot sequences. The correlation peaks are mapped to corresponding burst pilot indices (e.g., 0 to 511). In the preferred embodiment, the correlation peak values are compared to a predetermined threshold. Correlation peak values that are above this threshold provide an indication of a valid detected pilot signal. For each correlation peak that is above the predetermined threshold, the burst pilot index (e.g., 0 to 511), signal quality data, and a time offset value (based upon time-of-arrival) corresponding to the peak are stored in memory. In the preferred embodiment, the signal quality data for the given peak is represented by the correlation power for the given peak normalized to the total received energy in the channel. This correlation power is a metric of signal power. The stored data is then analyzed to identify false peaks among the set of detected pilots. Such false peaks occur as a result of correlation over the extended search window. The data pertaining to such false peaks is discarded (or otherwise ignored during subsequent processing). The false peaks are identified by locating adjacent pilot signal pairs and analyzing the relative power level for such adjacent pilot signal pairs to select the lowest power level pilot from the pair. The remaining data (with the data pertaining to any false peak pruned therefrom) is supplied to the input/output interface block 115 for output to the computer system 131 coupled thereto via port 127. The computer system 131 preferably provides data storage means for storing such data over a large number of locations together with a graphical user interface that displays such data to the user in real time as is well known.

Figure 6:
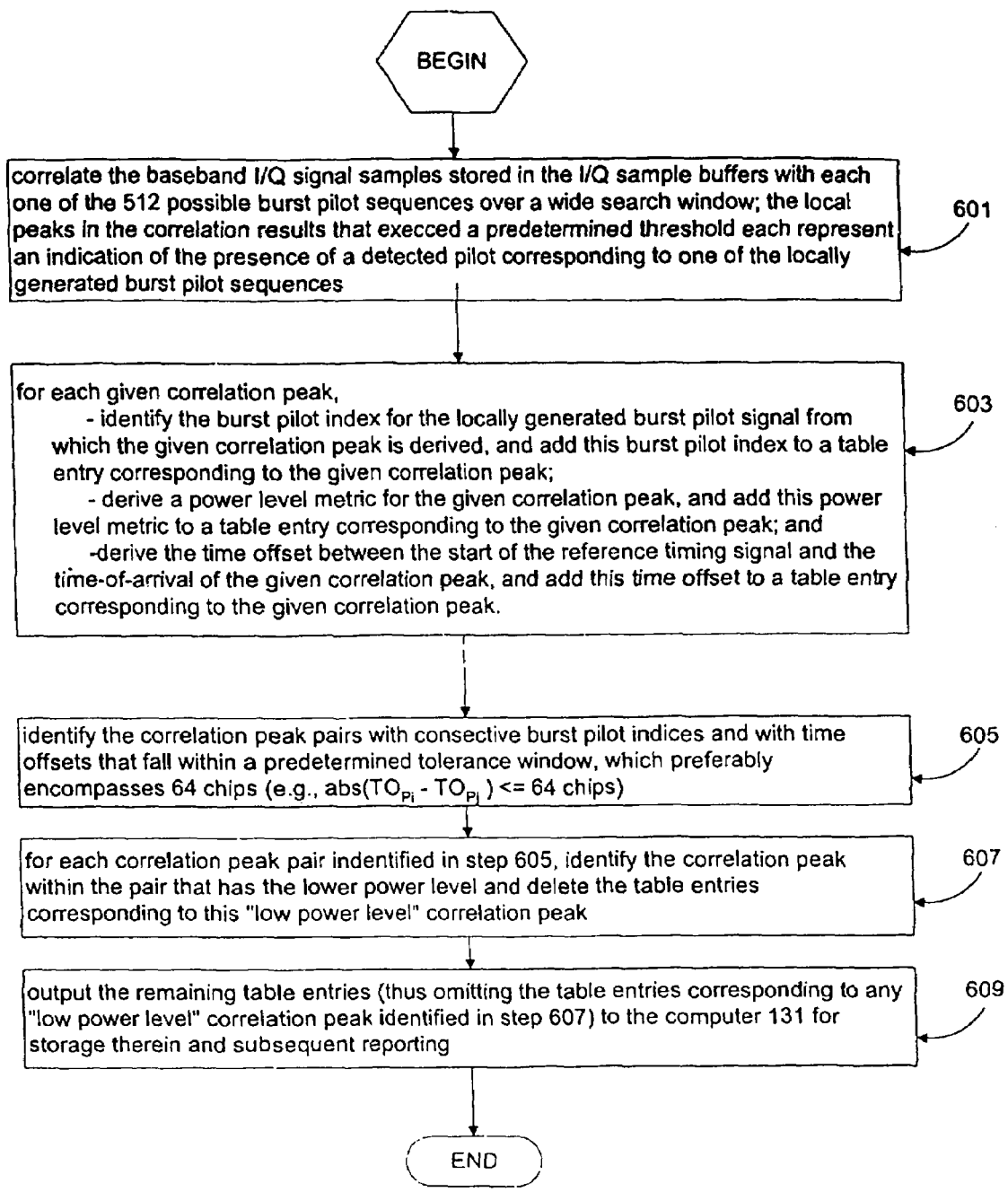
FIG. 6 is a flow chart illustrating an exemplary embodiment of correlation-based pilot detection operations carried out by the pilot detection block of FIG. 5.

FIG. 6 illustrates exemplary operations carried out by the pilot detection block 113 in accordance with a preferred embodiment of the present invention. The operations begin in step 601 wherein the baseband samples stored in the I and Q sample buffers 109 are correlated with each one of the 512 predetermined burst pilot sequences over an extended search window that is larger than 96 chips (i.e., the length of each burst pilot sequence). In the preferred embodiment, the search window has a length of 256 chips and can extend up to 1024 chips. The correlation peaks that exceed a predetermined threshold level are identified. Each peak represents an indication of the presence of a detected pilot signal corresponding to one of the 512 locally generated burst pilot sequences.

In step 603, the following is derived for each given correlation peak ($P_x$) identified in step 601:

the burst pilot index (0 to 511) for the locally generated burst pilot signal from which the correlation peak ($P_x$) is derived;

the time offset ($TO_{Px}$) between the time-of-arrival of the given correlation peak ($P_x$) and the start of the reference timing signal; and the correlation power level metric for the given correlation peak ($P_x$) which is derived by normalizing the correlation power for the given peak to the total received energy in the channel.

The above parameters are saved in table entries (stored in memory) that correspond to the given correlation peak ($P_x$).

In steps 605 and 607, the operations identify those table entries saved in block 603 that correspond to a false peak that occurs as a result of correlation over the extended search window, and the table entries corresponding to this false peak are deleted. In block 605, the pilot index for each pair of pilots (Pi,Pj) are analyzed to determine if they are consecutive (e.g., abs($Index_{Pi}$−$Index_{Pj}$)=1). These pairs are marked as pairs that likely to have a false pilot. These marked pairs are analyzed to determine if the time offsets of the pair fall within a predetermined tolerance window, which is preferably 64 chips in length (e.g., abs($TO_{Pi}$−$TO_{Pj}$)≦64 chips). Each correlation peak pair that satisfies this condition corresponds to an ambiguity that arises due to extended search window used in the correlation of step 601 as described above. In step 607, for each "false peak" correlation peak pair (Pi,Pj) identified in step 605, the operations identify the correlation peak of the pair that has the lower power level (e.g., Pi if the power level of Pi is less than the power level of Pj, or Pj if the power level of Pj is less than the power level of Pi). The table entries corresponding to this "lower power level" correlation peak are deleted. In this manner, the ambiguities identified in step 605 are resolved without L3 message detection and decoding.

Finally, in step 609, the remaining table entries are output to the computer 131 for storage therein. The output operations of 609 omit the table entries corresponding to any "lower power level" peak identified in step 607, and thus reflect the resolution of ambiguous correlation peaks as determined in step 607. Preferably, the computer 131 stores such data over a large number of locations together with a graphical user interface that displays such data to the user in real time as is well known.

A further improvement to this method is to modify step 607 such that the weaker power level pilot is deleted only if the difference between the stronger power level pilot and the weaker power level pilot exceeds a predetermined threshold. In other words, if ((Pi<Pj) and ((Pj−Pi)>Predetermined Threshold Difference)), then the pilot Pi is deleted. If ((Pj<Pi) and ((Pi−Pj)>Predetermined Threshold Difference)), then the pilot Pj is deleted.

The operations of FIG. 6 are illustrated in the following example. Suppose that the pilot scanner device 100 is operating in a 1xEV-DO network in a cell with an Access Point transmitting a burst pilot signal with an index of 256 and the operations of step 601 identifies two correlation peaks with the following parameters:

| Peak # | Pilot Index | Normalized Power (dB) | Time Offset (chips) |
|---|---|---|---|
| 1 | 255 | −10 | 9 |
| 2 | 256 | 0 | 73 |

Figure 7:
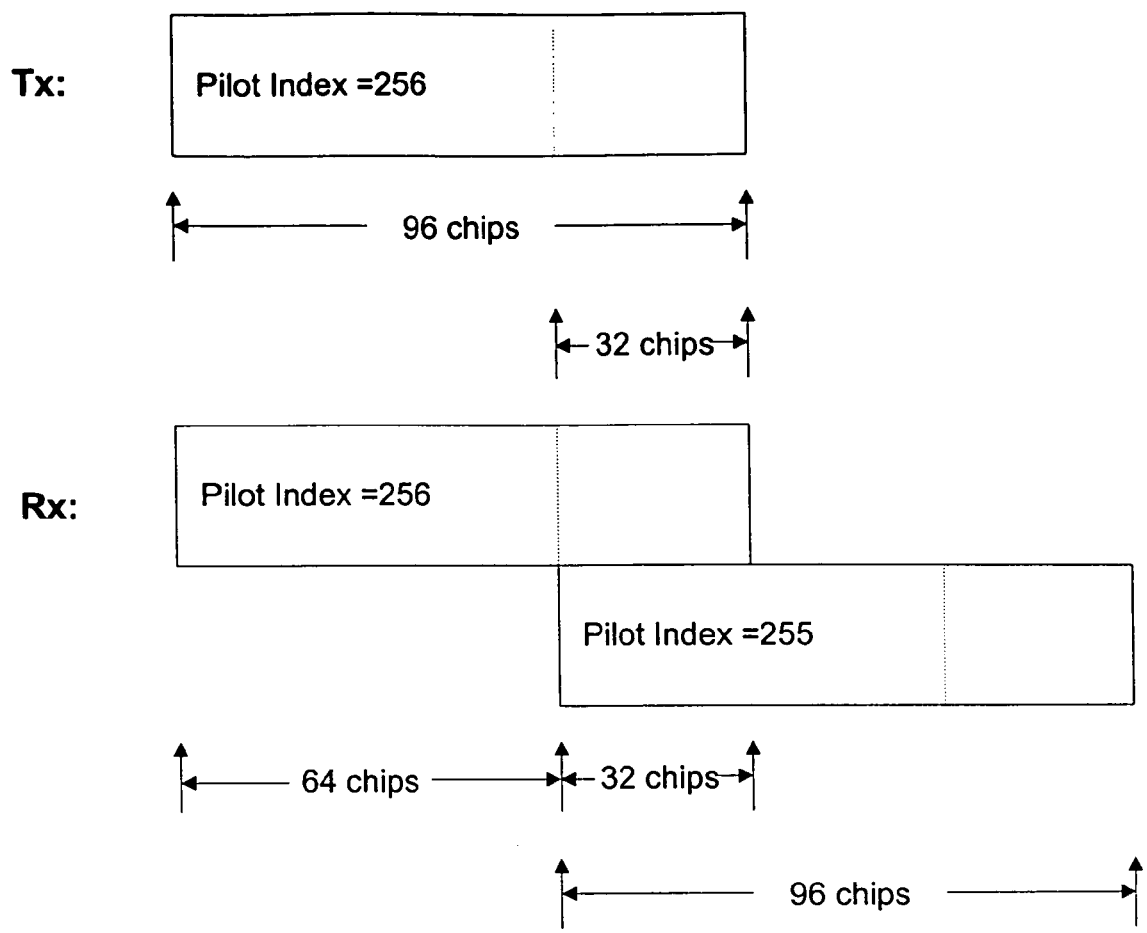
FIG. 7 is a diagram illustrating the 32 chip overlap shared by two adjacent pilot burst signals in 1xEV-DO networks.

These two peaks have consecutive pilot indices and have time offsets that fall within a predetermined tolerance window of 64 chips in length. Thus, the two peaks (#1, #2) are identified as satisfying the constraints of step 605. In step 607, peak #1 is identified as the "lower power peak" (because its power of −10 dB is less than the power of 0 dB of peak #2, and the table entries for peak #1 are deleted. Note that there is difference of about 10 dB between the valid correlation peak and the false correlation peak, This difference arises from the fact that the two consecutive burst pilot sequences (burst pilot sequence 255 and bust pilot sequence 256) have 32 chips overlap (e.g., difference in dB=20 log 10 (96/32)=9.5 dB) as shown in FIG. 7. In this manner, the ambiguities identified in step 605 are efficiently resolved without L3 message detection and decoding.

Advantageously, the pilot scanning apparatus of the present invention employs an improved mechanism to resolve ambiguities that arise in the correlation-based detection of pilot signals over an extended search window. The improved mechanism avoids L3 message detection and decoding, and thus is less complex and less costly to develop as compared to the prior art systems. Moreover, it decreases the processing time of the scanner and thus ultimately increases the scan speed.

There have been described and illustrated herein several embodiments of a pilot scanning apparatus for spread spectrum cellular radio communication systems, such as a 1xEV-DO network, and associated methods of operation. While particular embodiments of the invention have been described, it is not intended that the invention be limited thereto, as it is intended that the invention be as broad in scope as the art will allow and that the specification be read likewise. Such pilot scanning mechanisms are applicable to test measurement devices (that collect and store signal propagation data and coverage data) as well other radio receivers that are used for network troubleshooting in a 1x EV-DO network. Moreover, it is applicable to test measurement devices for other spread spectrum cellular radio communication systems that rely on beacon signals with overlapping portions or chunks for synchronization in the forward channel. In addition, while particular timing signals have been disclosed, it will be understood that other timing signals can be used in different architectures. For example, it is contemplated the reference timing signal used for correlation may be derived from a local timing source (which may or may not be synchronized to a GPS-based system clock). It will therefore be appreciated by those skilled in the art that yet other modifications could be made to the provided invention without deviating from its spirit and scope as claimed.

What is claimed is:

1. An apparatus for discovering beacon signals communicated over a wireless forward link from transmitters to receivers in a spread spectrum radio communication system, wherein the beacon signals comprise a plurality of different code sequences having index values assigned thereto and having portions that overlap one another, the apparatus comprising:

a radio subsystem that downconverts a received RF signal to a baseband signal and samples the baseband signal to derive baseband samples in digital form that represent at least one received beacon signal;

buffer means, operably coupled to said radio subsystem, for storing said baseband samples;

a timing signal generator for generating a reference timing signal; and beacon discovery means, operably coupled to said buffer means and said timing signal generator, for
i) correlating said baseband samples with said plurality of code sequences over an extended search window that has a length greater the characteristic length of said plurality of code sequences, and analyzing results therefrom to identify a set of correlation peaks that exceed a predetermined threshold;
ii) for each given correlation peak in the set identified in i), deriving and storing an index value assigned to a particular code sequence from which the given correlation peak is derived,
iii) for each given correlation peak in the set identified in i), deriving and storing a power level metric indicative of the received signal power of the given correlation peak,
iv) for each given correlation peak in the set identified in i), deriving and storing a time offset based upon said reference timing signal,
v) identifying correlation peak pairs that correspond to code sequences with overlapping portions and that have time offsets that fall within a predetermined tolerance window, and
vi) for each given correlation peak pair, identifying one of the correlation peaks of the given correlation peak pair that has a lower power level metric in relation to the other correlation peak of the given correlation peak pair, and discarding information pertaining to the one correlation peak from subsequent output and processing following therefrom.

2. An apparatus according to claim 1, wherein:
said beacon discovery means associates the index values assigned to the detected beacon signals to their corresponding power level metrics for subsequent processing operations.

3. An apparatus according to claim 1, further comprising:
a GPS receiver that receives and recovers a GPS signal;
wherein said timing signal generator generates said reference timing signal based upon said GPS signal.

4. An apparatus according to claim 1, wherein:
said spread spectrum radio communication system comprises an 1xEV-DO network.

5. An apparatus according to claim 4, wherein:
said beacon signals are pilot signals with an index value ranging from 0 to 511 corresponding to punctured code sequences that are 64 chips apart.

6. An apparatus according to claim 4, wherein:
consecutive code sequences have overlapping portions that are 32 chips in length.

7. An apparatus according to claim 4, wherein:
the extended search window has a length in a range between 256 and 1024 chips.

8. An apparatus according to claim 1, wherein:
at least one of said buffer means, said timing signal generator, and said beacon discovery means is realized as part of a processing platform.

9. An apparatus according to claim 8, wherein:
said processing platform comprises at least one of an digital signal processor, an FPGA, and an ASIC.

10. An apparatus according to claim 1, wherein:
in vi), the information pertaining to the one correlation peak is discarded only when the difference between the power level of the other correlation peak of the pair and the power level of the one correlation peak exceeds a predetermined threshold value.

11. A method for discovering beacon signals communicated over a wireless forward link from transmitters to receivers in a spread spectrum radio communication system, wherein the beacon signals comprise a plurality of different code sequences having index values assigned thereto and having portions that overlap one another, the method comprising:
  downconverting a received RF signal to a baseband signal and sampling the baseband signal to derive baseband samples in digital form that represent at least one received beacon signal;
  storing said baseband samples;
  generating a reference timing signal; and
  discovering beacon signals by:
    i) correlating said baseband samples with said plurality of code sequences over an extended search window that has a length greater the characteristic length of said plurality of code sequences, and analyzing results therefrom to identify a set of correlation peaks that exceed a predetermined threshold;
    ii) for each given correlation peak in the set identified in i), deriving and storing an index value assigned to a particular code sequence from which the given correlation peak is derived,
    iii) for each given correlation peak in the set identified in i), deriving and storing a power level metric indicative of the received signal power of the given correlation peak,
    iv) for each given correlation peak in the set identified in i), deriving and storing a time offset based upon said reference timing signal,
    v) identifying correlation peak pairs that correspond to code sequences with overlapping portions and that have time offsets that fall within a predetermined tolerance window, and
    vi) for each given correlation peak pair, identifying one of the correlation peaks of the given correlation peak pair that has a lower power level metric in relation to the other correlation peak of the given correlation peak pair, and discards information pertaining to the one correlation peak from subsequent output and processing following therefrom.

12. A method according to claim 11, further comprising:
associating the index values assigned to the detected beacon signals to their corresponding power level metrics for subsequent processing operations.

13. A method according to claim 11, further comprising:
receiving and recovering a GPS signal; and
generating said reference timing signal based upon said GPS signal.

14. A method according to claim 11, wherein:
said spread spectrum radio communication system comprises an 1xEV-DO network.

15. A method according to claim 14, wherein:
said beacon signals are pilot signals with an index value ranging from 0 to 511 corresponding to punctured code sequences that are 64 chips apart.

16. A method according to claim 14, wherein:
consecutive code sequences have overlapping portions that are 32 chips in length.

17. A method according to claim 14, wherein:
the extended search window has a length in a range between 256 and 1024 chips.

18. A method according to claim 11, wherein:
in vi), the information pertaining to the one correlation peak is discarded only when the difference between the power level of the other correlation peak of the pair and the power level of the one correlation peak exceeds a predetermined threshold value.

* * * * *